(12) United States Patent
Klein et al.

(10) Patent No.: US 8,098,236 B2
(45) Date of Patent: Jan. 17, 2012

(54) TOUCH-SENSITIVE SCREEN WITH HAPTIC ACKNOWLEDGEMENT

(75) Inventors: Martin Klein, Leun (DE); Dieter Nau, Wetzlar (DE)

(73) Assignee: Siemens VDO Automotive AG, Regensburg (DE)

( * ) Notice: Subject to any disclaimer, the term of this patent is extended or adjusted under 35 U.S.C. 154(b) by 727 days.

(21) Appl. No.: 11/886,543

(22) PCT Filed: Feb. 23, 2006

(86) PCT No.: PCT/EP2006/060211
§ 371 (c)(1),
(2), (4) Date: Sep. 14, 2007

(87) PCT Pub. No.: WO2006/097400
PCT Pub. Date: Sep. 21, 2006

(65) Prior Publication Data
US 2009/0051662 A1      Feb. 26, 2009

(30) Foreign Application Priority Data
Mar. 14, 2005   (DE) .......................... 10 2005 011 633

(51) Int. Cl.
G06F 3/041 (2006.01)
(52) U.S. Cl. ......................................................... 345/173
(58) Field of Classification Search .......... 345/173–178, 345/104; 178/18.01–18.09, 18.11
See application file for complete search history.

(56) References Cited

U.S. PATENT DOCUMENTS

| | | | |
|---|---|---|---|
| 6,585,203 B1 * | 7/2003 | Euker | 248/200.1 |
| 6,940,494 B2 * | 9/2005 | Hoshino et al. | 345/173 |
| 2002/0033795 A1 | 3/2002 | Shahoian et al. | |
| 2003/0184574 A1 | 10/2003 | Phillips et al. | |
| 2004/0136154 A1 * | 7/2004 | Hsu | 361/683 |
| 2005/0225539 A1 * | 10/2005 | Prados | 345/173 |
| 2007/0057924 A1 * | 3/2007 | Prados et al. | 345/173 |

FOREIGN PATENT DOCUMENTS

| | | |
|---|---|---|
| DE | 101 00 931 | 10/2001 |
| DE | 201 10 769 | 12/2001 |
| DE | 101 54 643 | 5/2003 |
| JP | 09167541 | 6/1997 |
| JP | 2003058321 | 2/2003 |

* cited by examiner

*Primary Examiner* — Stephen Sherman
(74) *Attorney, Agent, or Firm* — Cozen O'Connor

(57) ABSTRACT

A touch sensitive screen comprising a display device and a light-permeable, wherein a touch-sensitive arrangement arranged upstream of an image side of the display device at a distance therefrom. The arrangement can be displaced in relation to the display device such that a haptic acknowledgment is generated. The touch-sensitive arrangement forms part of the housing containing the display device, and the housing can be displaced in relation to the display device, by way of the touch-sensitive arrangement.

13 Claims, 2 Drawing Sheets

TOUCH-SENSITIVE SCREEN WITH HAPTIC ACKNOWLEDGEMENT

CROSS REFERENCE TO THE RELATED APPLICATIONS

This is a U.S. national stage of application No. PCT/EP2006/060211, filed on 23 Feb. 2006. Priority is claimed on the following application: DE 10 2005 011 633.7, filed 14 Mar. 2005, the content of which is incorporated herein by reference.

BACKGROUND OF THE INVENTION

The invention relates to a touch sensitive screen with haptic feedback.

Touch sensitive screens, which are also known by the designation of touchscreen, consist of a combination of a display device having a transparent, touch sensitive operating device arranged thereon. Upon being touched by a finger or a stylus, the touch sensitive operating device, which is also known under the designation of touchpad, generates an electrical signal that can be converted into a command, for example for displacing a cursor on the display device, or for selecting a menu option. Such touchscreens and touchpanels are sufficiently known.

Since, by contrast with conventional keys, touch sensitive screens have no pressure point, it is frequently unclear to the operator whether the operation he has undertaken has been detected. In order to give the user feedback in this respect, touch sensitive screens with haptic feedback are already known. Thus, DE 101 54 643 A1 describes an operating device for a screen controlled process that has a touch sensitive input field. The operating device has an electric motor, which is connected to an eccentric, for feedback. Alternatively, the input field can also be set to vibrate by means of ultrasound. The display area and the input area form a structural unit in the configuration as touchscreen.

US 2003/0184574 A1 discloses a touch sensitive screen in the case of which a touch sensitive arrangement is arranged on a plate at a distance from a display device. One or more actuators are connected to the plate and serve to produce haptic feedback when the plate is touched. The haptic feedback takes the form of vibrations or pulses.

Thus, in the case of such a touch sensitive screen a light transmitting, that is to say transparent, touchpanel is placed in front of the display device such that the graphic elements or alphanumeric characters displayed on the image side of the display device lie directly behind the control surfaces of the touch sensitive arrangement and are visible through them. There is the need in this case for a slight distance between the touch sensitive arrangement and the image side of the display device in order to avoid negative optical effects, it being possible, for example, for there to be an offset of the optical axis (parallax error) or image blurring. Dust or dirt that impairs the optical appearance can now penetrate into the interspace between the image side of the display device and the touch sensitive arrangement. The penetration of moisture with resultant misting over of the display device can also occur, particularly during use in motor vehicles.

SUMMARY OF THE INVENTION

It is therefore an object of the invention further to develop a touch sensitive screen with haptic feedback such that the abovenamed disadvantages are avoided and the touch sensitive screen is affected as little as possible by environmental influences even in everyday use.

This and other objects and advantages are achieved by the touch sensitive screen of the invention which is provided with a display device and a transparent, touch sensitive arrangement. The touch sensitive arrangement is arranged upstream of an image side of the display device and at a distance from the display device and can be moved relative to the display device in order to generate haptic feedback. Furthermore, the touch sensitive arrangement is a component of a housing enclosing the display device, where it is possible for the housing with the touch sensitive arrangement to be moved relative to the display device.

This provides a robust touch sensitive screen that is suitable for everyday use, in particular as a motor vehicle component, the penetration of dust or dirt between the image side of the display device and the touch sensitive arrangement being at least largely avoided.

The housing is preferably of dust-tight design. This can be achieved, for example, by providing openings, which are required to lead out connecting cables or fastening elements, with elastic sleeves that lie closely against the cables or where they are led out and against the housing.

In a preferred embodiment, the housing can be moved linearly in a plane running parallel to the image side of the display device. Since it is the case in this configuration that the distance between the touch sensitive arrangement and the display device always remains unchanged even during the haptic feedback, a particularly narrow gap can be implemented between the display device and the touch sensitive arrangement. This, in turn, has an advantageous effect on the optical appearance. In addition, there is reliable avoidance of inadvertent contact between the touch sensitive arrangement and the display device, such as can occur in the case of haptic feedback owing to vibration or a movement of the touch sensitive arrangement in the direction of the display device. Furthermore, it has emerged that such a lateral movement of the touch sensitive arrangement relative to the display device is very well perceived by the operator.

In one embodiment, the housing can be moved linearly in one dimension. A one dimensional movement is completely sufficient as haptic feedback, and can more easily be implemented than a two dimensional movement.

In another embodiment, the housing is arranged in a linearly movable fashion on a support element, there being present, in particular, means for guiding a movement of the housing relative to the support element. The guiding means ensure a reliable and defined movement of the housing. Even in the case of vibrations such as occur continuously in operation when the touch sensitive screen is used as a motor vehicle component, in particular, the guidance ensures a stable arrangement of the housing, while at the same time enabling a linear movement for the haptic feedback.

In a further embodiment, the display device is also fastened on the support element. In this case, the display device is fastened rigidly, or largely rigidly, on the support element such that a displacement of the display device is avoided. In order to fasten the display device on the support element, it is preferred to provide fastening elements that pass through openings in the housing. In order to ensure the housing is dust-tight, these openings are, as already stated above, sealed in turn but preferably with elastic sleeves that surround the fastening elements.

The display device is, in particular, a liquid crystal display. Such liquid crystal displays are sufficiently known and have also proved themselves sufficiently for use in motor vehicles.

In particular, a flat surface of the image side of the liquid crystal display is advantageous for use in the inventive touch sensitive screen.

BRIEF DESCRIPTION OF THE DRAWINGS

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

The invention is explained in more detail below with the aid of an exemplary embodiment and the drawing, in which.

DETAILED DESCRIPTION OF THE PRESENTLY PREFERRED EMBODIMENTS

Figure 1:
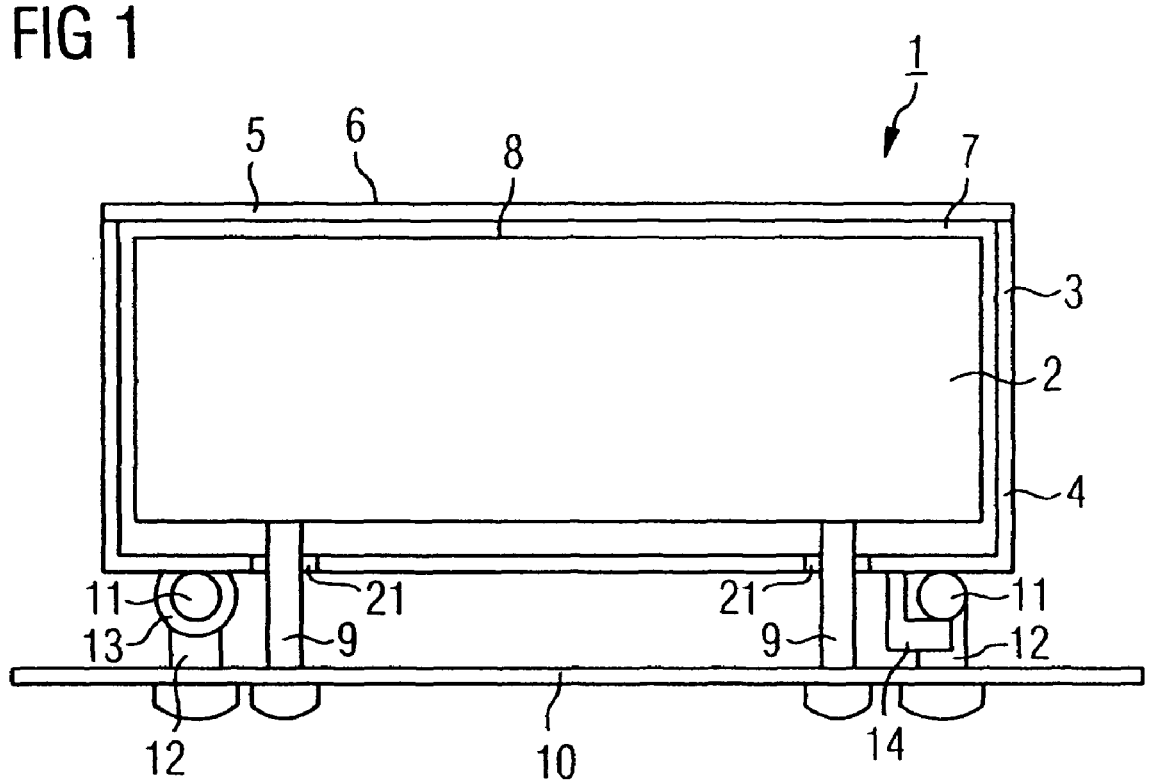
FIG. 1 shows a section through an inventive touch sensitive screen.

FIG. 1 shows a schematic cross section through a touch sensitive screen in accordance with the invention. The touch sensitive screen 1 has a display device 2 that is surrounded by a housing 3. The housing 3 consists of a trough 4 and a plate 5 that serves as cover and includes a touch sensitive arrangement 6. Use may be made as touch sensitive arrangement 6 of all known such transparent arrangements, independently of their specific configuration. Such arrangements are also sufficiently known and therefore need not be described in more detail here.

The plate 5 with the touch sensitive arrangement 6 is arranged at a distance from the display device 2 such that a gap 7 is produced between the display device 2 and the plate 5.

The display device is designed as a liquid crystal display (LCD). Liquid crystal displays are likewise sufficiently known and therefore need not be described in more detail. Commercially available liquid crystal displays are used here, in particular. The display device 2 has an image side 8 that faces the plate 5 with the touch sensitive arrangement 6. A viewer can view the symbols and/or alphanumeric characters displayed on the image side 8 of the display device 2 through the transparently designed plate 5 with a likewise transparently designed touch sensitive arrangement 6, and can select one of the displayed symbols, for example by touching the touch sensitive arrangement 6, the result being that a specific command is executed, for example.

The display device 2 is rigidly connected to a support element 10 by fastening elements 9. The fastening elements 9 in this case project through openings 21 in the housing 3.

Furthermore, guide rods 11 are arranged on the support element 10 at a distance from the support element 10 by means of further fastening elements 12. The guide rods 11 engage in eyes 13 and hooks 14 of the housing 3. The housing 3 with the plate 5 having the touch sensitive arrangement 6 can therefore be moved linearly in a longitudinal direction of the guide rods 11, that is to say perpendicular to the plane of the drawing, specifically relative to the support element 10 and the display device 2 rigidly connected to the support element 10.

A drive device (not shown here) can be used to perform such a linear movement. The drive device can, in particular, be a conventional rotary motor with an appropriate drive, a linear motor or else a stepping motor, or otherwise piezoelectric adjusting elements. The requisite amplitudes, with usually a few millimeters, are therefore very slight in this case.

In the exemplary embodiment, the amplitude is only 1 mm, corresponding to a deflection of ±0.5 mm from the rest position.

The touch sensitive arrangement and the display device are connected to an evaluation and control device via electric connecting elements (not illustrated here).

Figure 2:
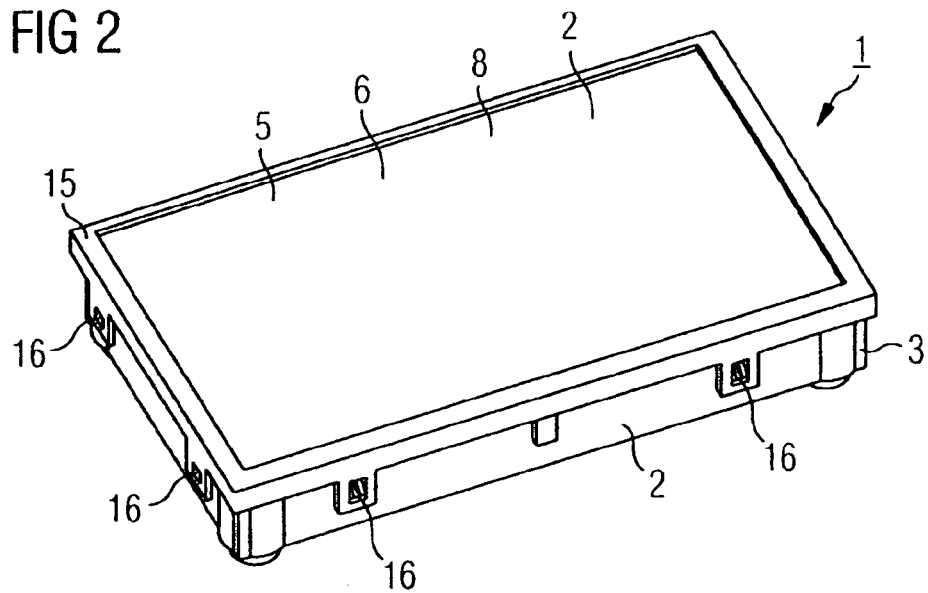
FIG. 2 shows a perspective view of a touch sensitive screen with the front side having the touch sensitive arrangement.

FIG. 2 shows the touch sensitive screen 1 in a perspective view. The plate 5 with the touch sensitive arrangement 6 and the image side 8, arranged at a slight distance thereunder, of the display device 2 faces an operator. The plate 5 is held by a frame 15 and fastened with the aid of the latter to the trough 4. The connection of the frame 15 to the trough 4 is performed by means of latching connections 16. The elastic sealing element prevents the penetration of dust between the frame 15 and the trough 4.

Figure 3:
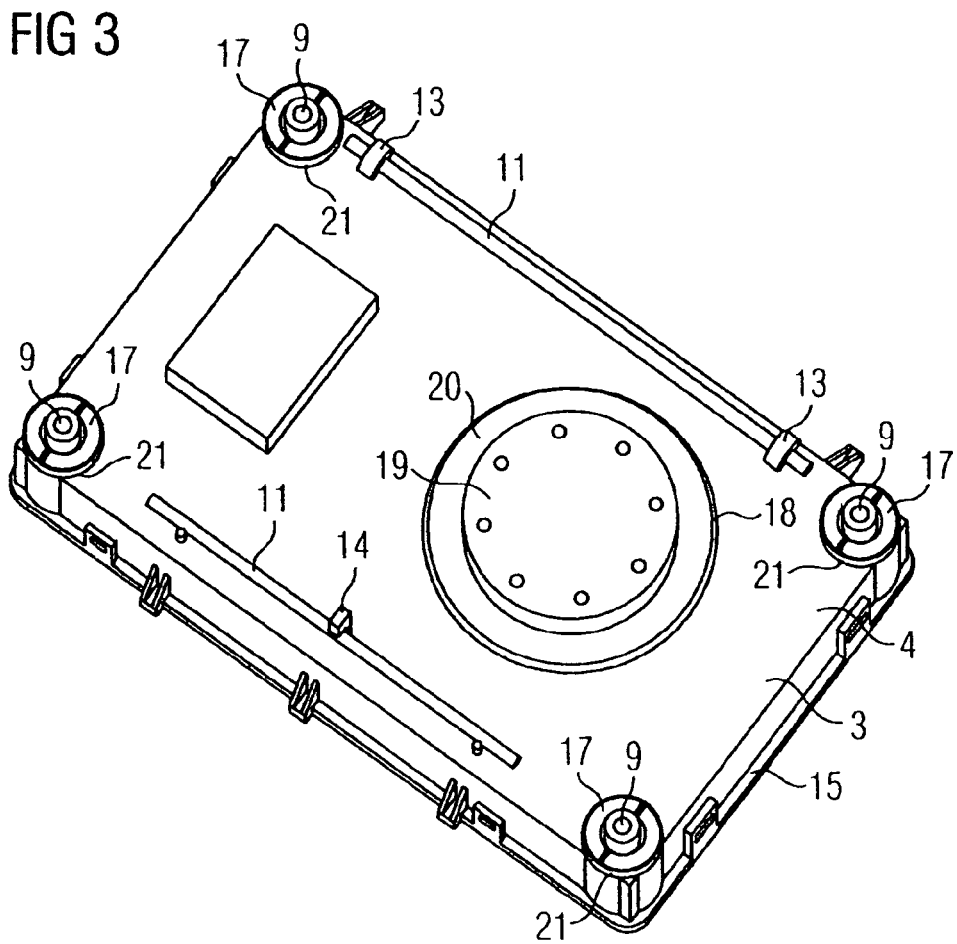
FIG. 3 shows a perspective view of the rear side of a touch sensitive screen with guiding and fastening elements.

FIG. 3 shows a further perspective view of the touch sensitive screen, seen from a rear side. The trough 4 of the housing 3 has eyes 13 and hooks 14 in which guide rods 11 are fastened. As shown in FIG. 1, the guide rods 11 are fastened on the support element 10 by means of fastening elements 12. Four fastening elements 9 of the display device 3 arranged in the interior of the housing 3 project through openings 21 in the housing 3 and are provided for rigidly fastening the display device 2 on the support element (not illustrated here). Further provided in the openings 21 are sealing elements 17 which seal the housing 3 against the fastening elements 9.

A printed circuit board 19 is arranged in a further opening 18 in the housing 3, the remaining space in the opening 18 also being closed here by a further sealing element 20.

If the display device is now rigidly connected to a support element by means of the fastening elements 9, the housing 3 can be moved along the guide rods 11 relative to the display device 2 by means of a drive device (not illustrated) in order to produce haptic feedback. In this case, the movement will preferably be performed as movement to and fro along the guide rods 11 which, for their part, are permanently arranged on a support element.

The invention provides a touch sensitive screen that has haptic feedback and is, in addition, suitable for everyday use.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A touch sensitive screen, comprising:
   a support element;
   a display device substantially immovably fastened to the support element;

a housing completely enclosing the display device, the housing including:
: a transparent, touch sensitive arrangement accessible through the housing disposed above an image side of the display device and at a distance from the display device, said touch sensitive arrangement being moveable relative to the display device to generate haptic feedback;

wherein the housing with the touch sensitive arrangement is moveable in a plane substantially parallel to the display device and the housing is configured to move linearly along a single axis relative to the support element, whereby the movement of the touch sensitive arrangement along the single axis provides the haptic feedback.

2. The touch sensitive screen as claimed in claim 1, wherein the housing is linearly moveable in a plane running parallel to the image side of the display device.

3. The touch sensitive screen as claimed in claim 1, wherein the housing is dust-tight.

4. The touch sensitive-screen as claimed in claim 3, wherein the housing is configured to completely surround the display.

5. The touch sensitive screen as claimed in claim 1, further comprising means for guiding a movement of the housing relative to the support element.

6. The touch sensitive-screen as claimed in claim 5, wherein the means for guiding include a linear guide.

7. The touch sensitive-screen as claimed in claim 6, wherein the linear guide comprises:
: at least one longitudinally arranged guide rod element coupled to the support element and slidingly coupled to the housing,
: wherein the at least one longitudinally arranged guide rod element defines the linear motion of the housing relative to the support.

8. The touch sensitive-screen as claimed in claim 7, wherein the at least one longitudinally arranged guide rod element is slidingly coupled to the housing by at least one hook eye.

9. The touch sensitive screen as claimed in claim 1, wherein the display device is fastened on the support element by fastening elements passing through openings in the housing.

10. The touch sensitive screen as claimed in claim 1, wherein the display device is a liquid crystal display.

11. The touch sensitive screen as claimed in claim 1, wherein the touch sensitive screen is a component in a motor vehicle.

12. The touch sensitive-screen as claimed in claim 1, further comprising:
: at least one longitudinally arranged guide element coupled to the support element and slidingly coupled to the housing,
: wherein the at least one longitudinally arranged guide element defines the linear motion of the housing relative to the support.

13. The touch sensitive-screen as claimed in claim 12, wherein the at least one longitudinally arranged guide element is slidingly coupled to the housing by at least one hook eye.

\* \* \* \* \*